United States Patent
Tatara et al.

[15] 3,693,206
[45] Sept. 26, 1972

[54] CAR WASHING DEVICE

[72] Inventors: Seizo Tatara, 18, Takidai-cho, Chiba-ken, Funabashi-shi; Yoshio Ohdachi, 1477, Higashiterao-cho, Tsurumi-ku, Kanagawa-ken, Yokohama-shi, both of Japan

[22] Filed: May 13, 1970

[21] Appl. No.: 36,728

[52] U.S. Cl............15/21 D, 15/181, 15/230.14
[51] Int. Cl...................................B60s 3/06
[58] Field of Search..........15/DIG. 2, 21 D, 21 E, 53, 15/97, 181, 210, 302, 230, 230.14, 230.19

[56] References Cited

FOREIGN PATENTS OR APPLICATIONS 544,132   7/1957   Canada................15/DIG. 2
757,722   9/1956   Great Britain..........15/DIG. 2

*Primary Examiner*—Edward L. Roberts
*Attorney*—Steinberg & Blake

[57] ABSTRACT

A car washing device comprises a plurality of soft and small diameter rotary brushes which are secured to resilient flexible shafts, with two or more sets of brushes in pairs, and with two brushes in a pair being spaced apart adequately and rotated at low speeds. The brushes are soft enough to be compressed to every curved surface of an automobile. The latter brush assembly forms part of an entire car washing installation through which automobiles are automatically drawn while suitable devices are arranged along the installation for washing, polishing and drying each automobile as it passes through the installation.

6 Claims, 8 Drawing Figures

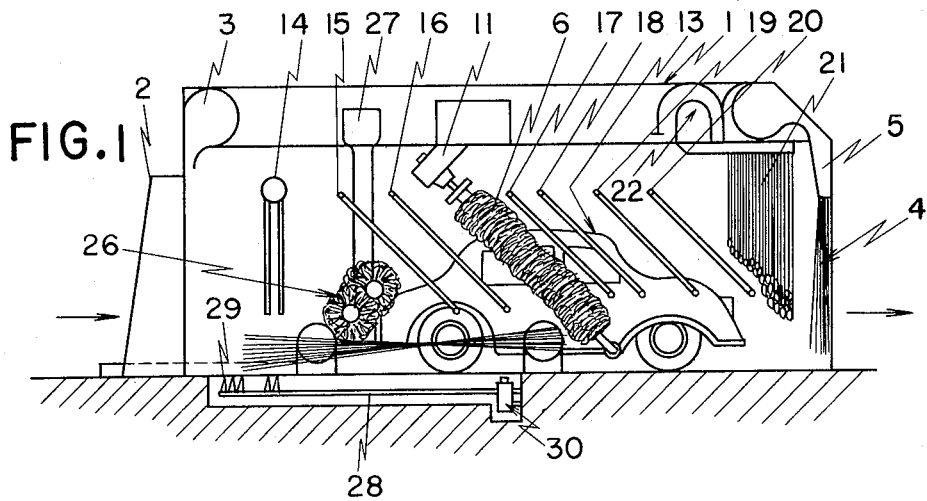
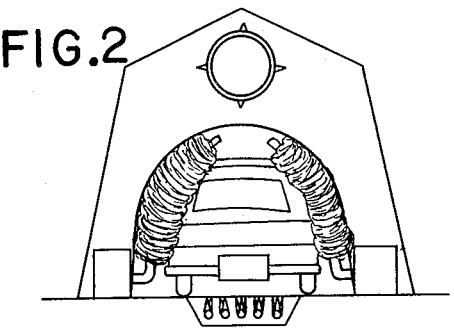
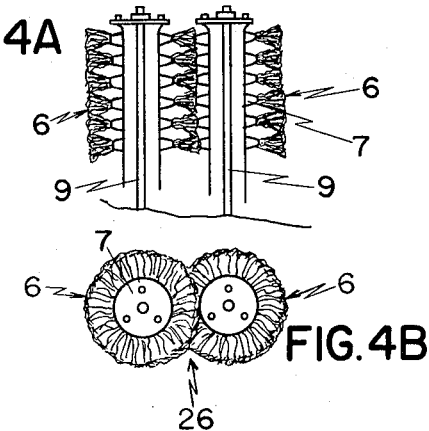
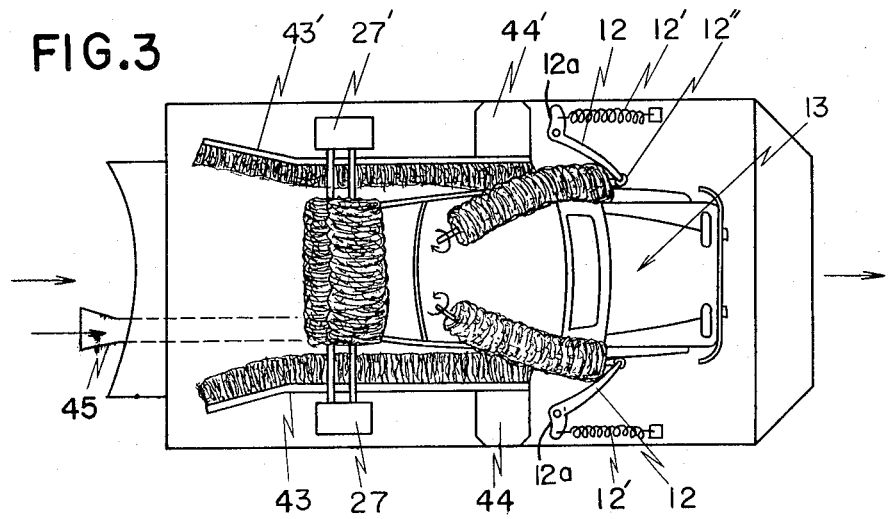

INVENTORS
SEIZO TATARA AND
BY YOSHIO OHDACHI
Steinberg & Blake
ATTORNEYS

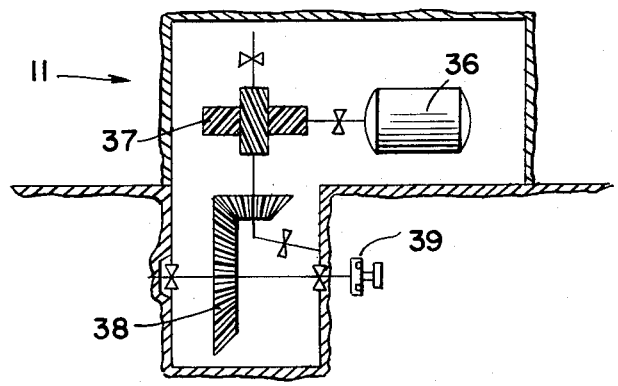
FIG.11
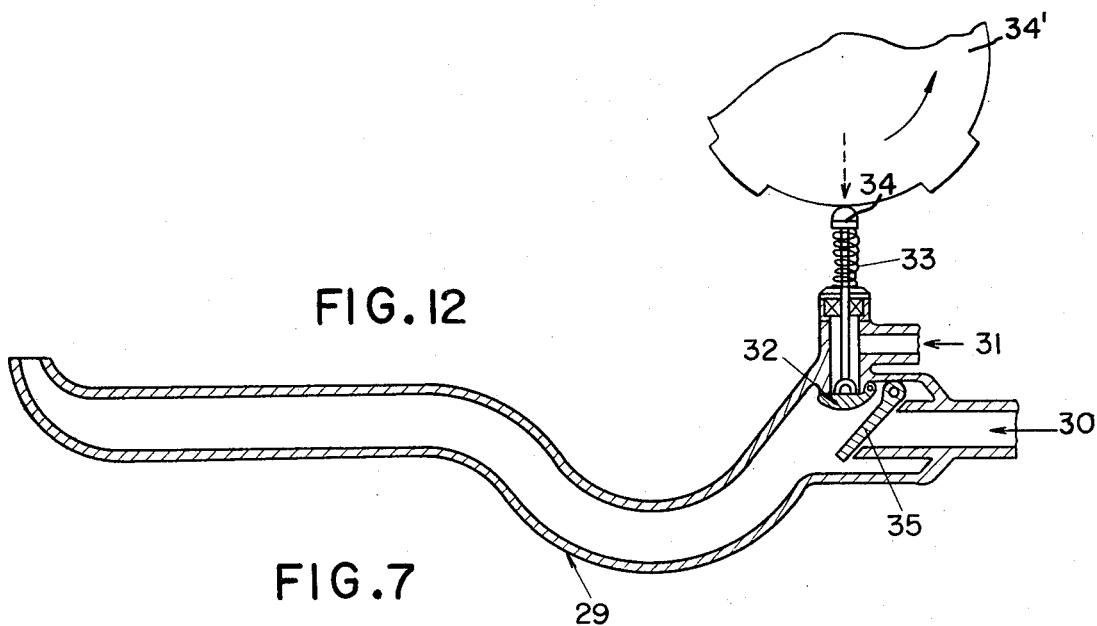
FIG.12
FIG.7
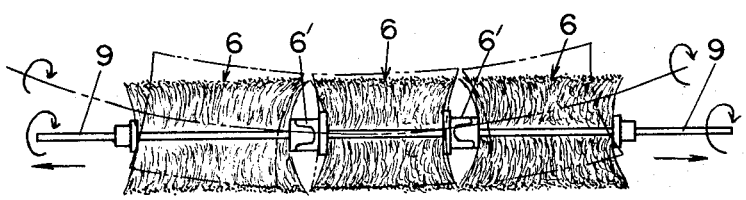
INVENTORS
SEIZO TATARA AND
BY YOSHIO OHDACHI
Steinberg + Blake
ATTORNEYS

CAR WASHING DEVICE

This invention relates to a complete car washing device providing hot water washing and drying.

A principal object of the present invention is to provide a device for complete washing of a car body very efficiently causing no scratches or spots due to washing using brushes.

A preferred embodiment of the present invention is illustrated in accompanying drawings, in which:

FIG. 1 is a vertical sectional view showing a car washing device according to the present invention;

FIG. 2 is a front elevation of the device of the present invention;

FIG. 3 is a plan view of the device;

FIGS. 4A and 4B are respectively plan and end views showing rotary brushes in engagement with each other;

FIG. 7 is a side view showing a plurality of rotary brushes connected by flexible shaft and universal ball-socket joint;

Figure 5:
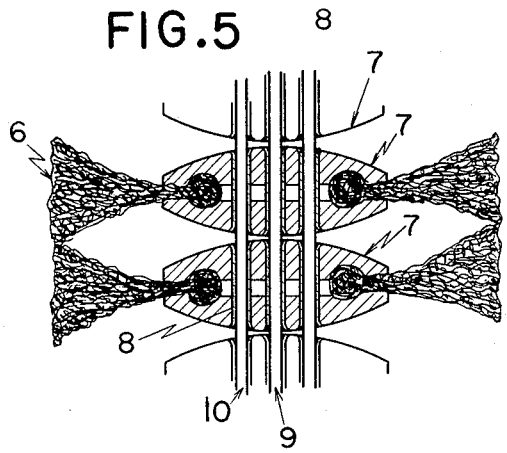
FIG. 5 is a section of a rotary brush.
Figure 6:
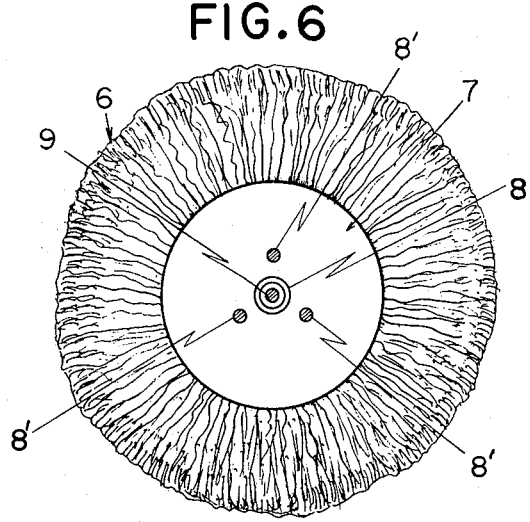
FIG. 6 is a front view of the rotary brush.
Figure 8A:
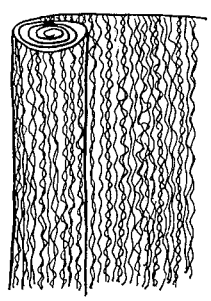
Figure 8B:
Figure 8C:
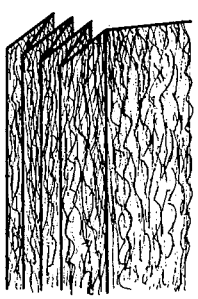
Figure 8D:
Figures 9, 9B:
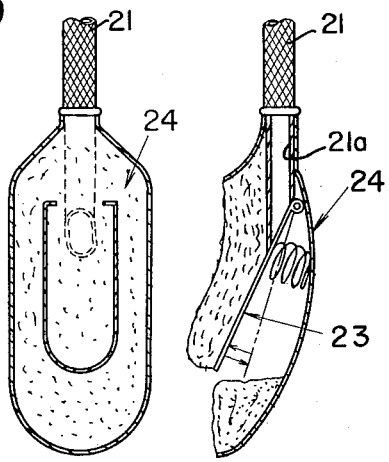
Figure 10A:
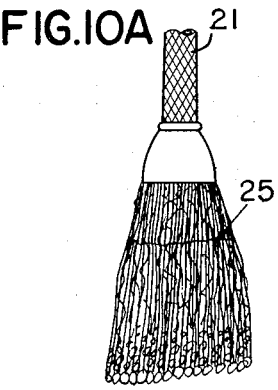

FIGS. 8A, 8B, 8C, and 8D illustrate processes of manufacturing a rotary brush from web-like synthetic resin material, in which FIG. 8A denotes a roll of the web, FIG. 8B illustrates gathered web having a root portion fused by heat in a spherical shape, FIG. 8C illustrates a web in a folded condition, and FIG. 8D illustrates a root of FIG. 8C fused in a rod-shape, FIGS. 9A and 9B are respectively front and side views of a sponge-made water absorber, FIG. 9B being a partially sectional view thereof;

FIG. 10A is a view of a water suction brush and

Figure 10B:

FIG. 10B a side view thereof respectively.

FIG. 11 illustrates a motor-driven transmission; and

FIG. 12 illustrates in a longitudinal section a high pressure water jet pipe.

Generally, the conventional car washing devices are of a construction so designed that large rotary brushes made of rigid hairs are securely provided on sturdy and inflexible shafts which are rotated at high speeds, the expansion pressure produced by centrifugal force of the rotary brushes being used for washing of the car through frictional action of the brushes and by effect of great quantities of water showered all over the car body. After being washed the car is dried with a strong and great wind blown out by means of a blower so as to blow off the water drops, wherein a relatively high capacity pump is used for washing the lower part of the car for jetting highly compressed water. In the former car washing process the car has often had scratches or spots on the outer surface thereof and in the latter process of drying the device required a large power source. These were disadvantages.

The present invention has for its object to eliminate the drawbacks as above described.

According to the present invention, a car washing device is proposed wherein rotary brushes are provided with flexibility and resiliency by which the rotary brushes are easily deformed to every curved surface of a car during slow rotation so as to effect washing as smooth as manual washing with soft leather, so as to eliminate the undesired scratches or spots as described.

In the course of washing there is used the least amount of washing water, cleanser, and warm water to help degelatinizing the emulsified wax. In the drying process after washing the car surface is completely swept of remaining water drops from the car surface by the water absorbing sponge or brush. Thereafter the car body is passed through a hot air curtain so that the drying of the surface can be accomplished by the above-described means as well as by the retained temperature of the car body. The lower part of the body can be washed by jetting of washing water as produced by multiplication of pressure of the compressed air and the speed of flow water. The power needed for the washing can be very small in capacity.

The present invention will be described more in detail by way of example with reference to the accompanying drawings.

In the drawing, a washing car chamber 1 shown in a tunnel-like form is provided at an inlet 2 thereof with a normal temperature air curtain 3. Warm air curtain 5 is provided at an outlet 4, using waste heat such as, for example, heat derived from heat exchange with waste heat from a boiler. Numeral 6 denotes a small diameter brush constituting an essential portion of the present invention. As shown in FIGS. 4A, 4B, 5 and 6, the brush in accordance with the present invention is so constructed as is illustrated in the following. There are provided synthetic resin fiber webs as shown in FIGS. 8A-8D between two plates 7 7 which have convex exterior surfaces and several holes 8 8 in the middle and at the periphery thereof. These webs are each bound as shown at FIGS. 8A-8D, the root of which is tightly formed in the ball-like form illustrated in FIG. 8B or rod-like shape illustrated in FIG. 8D, which is alternately laminated with soft resilient material such as polyethylene and is laid in multiple layers. Through a central hole 8 of each plate 7 is inserted a shaft 9 of glass fiber having good resiliency and flexibility. Through holes 8' at the periphery is passed a rope 10 of synthetic resin of the sturdy characteristic so as to form those components into an integral unit 6. Such integral units in two or more sets are obliquely provided at preferred intervals so that the sets of the units can be expanded to left and right in a fanlike shape. The obtained brushes may be rotated at a low speed of 50 to 200 RPM by a motor 11 provided at the upper part of the car washing chamber 1. Thus, as shown in FIG. 7, the sets of brushes 6 are interconnected along the rod 9 by way of ball-and-socket joints 6'. As is illustrated in FIG. 11, the unit 11 includes a motor 36 which through the worm gear drive 37 and the bevel gear drive 38, driven from the worm gear drive, rotates one end of the shaft 9 through a universal joint 39. The lower ends of the shafts of these brushes are each supported by a bearing 12" having a lever 12 always tensioned by a spring 12' as shown for example in FIG. 3.

The levers 12 are respectively supported for swinging movement about the pivots 12A so that in response to swinging of the levers 12 and the joints along the shaft 9 as shown in FIG. 7 it is possible for the brushes to adapt themselves to the different sizes and configurations of the car 13 while being continuously driven through structure as shown in FIG. 11.

There are provided a washing shower 14, a cleanser shower 15 for radiator grilles, a cool water shower 16, a cleanser shower 17, a clean water shower 18, a spray pipe 19 of aqueous emulsified wax, a warm water shower 20 for finishing process, a vacuum pump 22, and flexible hanging tubes 21 for strong vacuum water absorption. At the end of each tube 21 is a water absorbing sponge 24 having a valve 23 as shown in detail in FIGS. 9A and 9B. Each tube 21 has at its lower end an extension 21a terminating in a bottom inclined open end normally closed by a spring-pressed valve plate 23, and a suitable sponge material covers the plate 23 and the support for the spring as illustrated in FIGS. 9A and 9B. In response to engagement with a car, the plate 23 is swung in opposition to the spring in a counterclockwise direction, as viewed in FIG. 9B, so as to open the lower end of the extension 21a, thus placing the sponge material in communication through the flexible tubes 21 with the vacuum pump 22, and in this way drying is effected. However, it is also possible to use an arrangement as shown in FIGS. 10A and 10B where a water absorbing brush for wiping water through capillary tubes 25 is shown so that by capillary action the tubes 25 will draw water from the wet surface and deliver the water to the flexible suction tubes 21 which are in communication with the vacuum pump 22. Two units of rotary brushes are shown at 26 in FIGS. 1 and 4A, 4B, which have a similar construction as the described rotary brush 6. Said two units of rotary brushes are provided in the device so as to move vertically by a friction clutch and a hoist motor 27 on the sides of the flexible shaft during rotation by tension directed to the front, upper, and back surfaces of the car 13 which is moved in the car washing chamber 1. Reference numeral 28 denotes a water gum for impulsively washing the lower surface of the car body by highly compressed water. The gun body 29 is for a certain 12 length appreciably throttled at the forward end, as shown in FIG. 12 the inner surface of which is coated with an antifriction material for example Teflon, so as to possibly lessen the friction with water. A water feed pipe is shown at 30 which maintains hydraulic pressure at 5 to 6 Kg/cm². Reference numeral 31 denotes a compressed air feed pipe having a pressure of 7 to 8 Kg/cm². Valve 32 is normally closed by a spring 33. When head 34 is suddenly opened for a short period of time by appropriate motor driven cam means 34' the compressed air flows into the gun body 29 to close the valve 35 so that the water is stopped to flow and the air enters the pipe, with the result that the water in the pipe is carried leftwards, as viewed in FIG. 12. The water and the air alternately enter the gun body so that the valve 35 will open to allow the water to flow into the pipe and reach the end of the pipe where the fluid is accelerated in speed at the slightly throttled part, raised in speed and discharged to outside. In this case, jetting of the air after discharging of the water is in the rate of one seven hundred and seventieth of resistance of the water wherein after discharged without resistance the subsequently supplied water is accelerated in speed by succeeding strong air pressure and rushes into the throttled part at the forward end of the pipe. Furthermore, the water multiplied of its speed turns to an impulsively rushing water mass under high pressure of several hundreds Kg/cm². Thus the water strongly washes the mud away from the lower surface of the car body and fenders completely. 43 43' designate wheel washing brushes which effect washing by combination of rotation and parallel movement in cooperation with a sideward shower relative to the wheel by adequate interconnection mechanism 44 44', such as a motor-driven crank mechanism, so as to completely wash the wheels of the automobile passing through the car washing chamber 1. 45 indicates rails for introducing the car body for moving it from the inlet 2 side to the outlet 4 side of the car washing chamber 1 by own power or conveyor.

All of the above-described components are mounted in any suitable manner in the positions illustrated on suitable brackets, beams, or the like. Particular elements to control the operations are not required inasmuch as all of the various moving parts operate continuously and simultaneously without any timed relation or the like being required in the manner in which the various components are operated.

Operation of the device of the invention is now described briefly. When the automobile is introduced along the rails 45 into the car washing chamber 1, the automobile body which has entered the chamber, which is higher in temperature than the outside air, through the air curtain 3 is completely washed to eliminate the mud on the lower surface of the car body by striking of the water mass discharged from the water gun 28 to wash the lower part from the front to lower surface and to the backside of the fender. At the same time the front, upper and back surfaces are washed by the cleanser and the water alternately discharged from the showers 14 and 15 as well as by the upwardly moving rotary brushes 26. As the cleanser of adequate amount is discharged by the showers 16 17 the whole surface of the car body can be washed. Herein, the car body passes through between the rotary brushes 6 whereupon each rotary brush 6 is slowly rotated in slight contact with the curved surfaces of the car body by action of the spring lever 12 whereby the car body is washed of its corner parts completely without leaving any spot and washed subsequently by clean water shower 18, coated with aqueous wax discharged from the spray tube 19, applied with emulsified wax by hot water shower 20 and preheated. The car retaining the warmth passes below the flexible tubes 21 having the water absorbing sponges 24 and the water absorbing brushes 25, when all water drops remaining at the upper surface of the car body may be wiped out. Lastly the car is fully dried by the warm air curtain 5 at the outlet 4 and put to polishing. During this time the water drops wiped from the car body are discharged to the outside with the air by means of a vacuum pump 22.

We claim:

1. In a car washing installation, a plurality of rotary brush assemblies each comprising an elongated rotary flexible shaft and a plurality of brush sets carried by said shaft for rotary movement therewith, and distributed along said shaft, each of said brush sets including brush components consisting of a relatively soft, flexible sheet material gathered together at the region of said rotary shaft and freely radiating therefrom, and means at said shaft holding the gathered sheet material of said brushes and connected to said shaft for rotation therewith, said brush assemblies being distributed with respect to each other for engaging the exterior surface of a car body which moves through the installation, and a drive means operatively connected with said brush assemblies for rotating said shafts thereof, whereby the sheet material which forms the car-engaging portions of the brush assemblies yields to the different configurations of a car for providing a gentle non-abrasive rubbing action for cleaning the car without damaging the surface thereof.

2. The combination of claim 1 and wherein said sheet material is in the form of a synthetic resin.

3. The combination of claim 1 and wherein said sheet material is in the form of a foamed polyethylene, so that the material is not only flexible but also is capable of undergoing compression and expansion while engaging the surface of a car.

4. The combination of claim 1 and wherein said means for holding the gathered portions of the sheet material adjacent said shaft includes pairs of coacting plates between which the gathered portions of the sheet material are clamped, said plates being formed with openings through which said shaft extends and said plates having exterior convexly curved surfaces so that the sheet-material bodies clamped between the pairs of plates can tilt with respect to each other in response to bending of the flexible drive shaft.

5. The combination of claim 1 and wherein said shaft is made of resilient glass fiber.

6. The combination of claim 4 and wherein said plates are formed with additional openings through which flexible means extend for connecting the brush units to each other.

* * * * *